United States Patent [19]
Stannard

[11] 3,988,396
[45] Oct. 26, 1976

[54] AERATION TUBING SYSTEM

[76] Inventor: Forrest B. Stannard, 1910 NE. 43rd Court, Fort Lauderdale, Fla. 33308

[22] Filed: June 16, 1975

[21] Appl. No.: 587,207

Related U.S. Application Data

[63] Continuation of Ser. No. 412,173, Nov. 2, 1973, abandoned.

[52] U.S. Cl. ............................... 261/124; 239/534
[51] Int. Cl.$^2$ ............................................ B01F 3/04
[58] Field of Search ............ 261/124; 239/534, 542, 239/450; 61/12

[56] References Cited
UNITED STATES PATENTS

| | | | |
|---|---|---|---|
| 2,771,320 | 11/1956 | Korwin | 239/534 |
| 2,814,529 | 11/1957 | Arnt | 239/450 |
| 3,186,644 | 6/1965 | Ross et al. | 261/124 |
| 3,293,861 | 12/1966 | Hinde | 261/124 |
| 3,525,685 | 8/1970 | Edwards | 261/124 |
| 3,677,936 | 7/1972 | Bastiaanse | 261/124 |
| 3,698,195 | 10/1972 | Chapin | 239/542 |
| 3,736,755 | 6/1973 | Hammond | 61/12 |

Primary Examiner—Tim R. Miles
Attorney, Agent, or Firm—Malin & Haley

[57] ABSTRACT

An aeration system comprising a long resilient plastic tube having a plurality of aeration slit valves therein, a control means connected about the outside of said tube to control the size of the aeration slit valve openings when the tubing is under pressure, and a second tube encompassing the first tube and the control means. The second tube also includes a plurality of slit or perforated type openings therein. Said aeration system providing a non-floating, weighted aeration system having a controlled aeration flow of air out through the slits in said tubing system along length of system and may include a smooth outer diameter surface to prevent material from snagging on said tubing system when placed in a sewage system.

2 Claims, 3 Drawing Figures

AERATION TUBING SYSTEM

This is a continuation of application Ser. No. 412,173, filed Nov. 2, 1973, now abandoned.

BACKGROUND OF THE INVENTION

This invention relates to a new and improved aeration system and more particularly to an aeration tube combined with a control means for controlling the outflow of air from the slit valves along the length of the aeration tube.

In the past, aeration devices were constructed of resilient plastic tubes having a plurality of aeration slits therein. Second tubes have been placed over the first tube to control the flow of air out of the aeration device. Weights have been added to the aeration device to control its buoyancy. The weights project radially outwardly from the tube and snag material flowing around the tube and therefore create costly maintenance problems.

BRIEF DESCRIPTION OF THE INVENTION

The present invention relates to a new and improved aeration system comprising a long resilient plastic tube having a plurality of aeration slit valves therein for controlling the flow of air bubbles out of the system along the entire length of the system. The aeration system includes a control material wound or connected about the outside of said plastic tube to control the size of the aeration openings when the tube is under pressure and to provide weight to control the buoyancy of the system. The control material allows higher pressure to be used in said plastic tube. Increase in pressure will tend to decrease the size of the slit valve openings. The system may also include a second tube encompassing the first tube and the control material. The second tube also includes a plurality of slit or perforated type openings therein that may also be used to control the size of the air bubbles along the length of the system, as well as, increasing the length of the aeration system. Said aeration system provides a non-floating aeration system having a controlled outflow of air through the slit valves along the entire length of the tubing system. The outer surface of the second tube is smooth to prevent material flowing around the second tube from being snagged.

It is an object of this aeration system to control the flow of air bubbles out of the system along the entire length of the tube.

Another object of this invention is to provide control material wound about the outside of said tube to control the size of the aeration openings in the tube when the tube is under pressure.

A further object of this invention is to provide a second tube with a smooth outer surface encompassing the first tube and the control material.

Another object of this invention is to provide a non-floating, weighted aeration system having a controlled aeration flow out through the slits in said tubing system along the length of the tubing system and including a smooth outer surface.

In accordance with these and other objects which will be apparent hereinafter, the instant invention will now be described with particular reference to the accompanying drawings.

DESCRIPTION OF A PREFERRED EMBODIMENT

Figure 1:
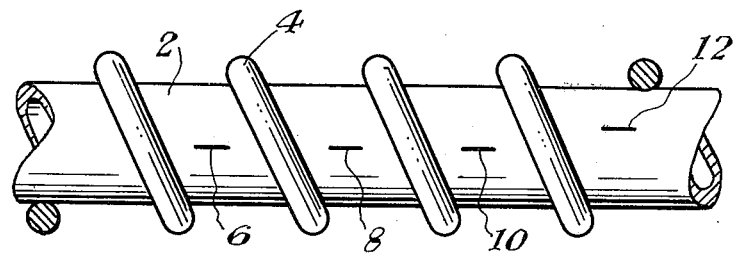
FIG. 1 is a side view of a portion of the first tube and the control material in the form of a spiral wire.
Figure 2:
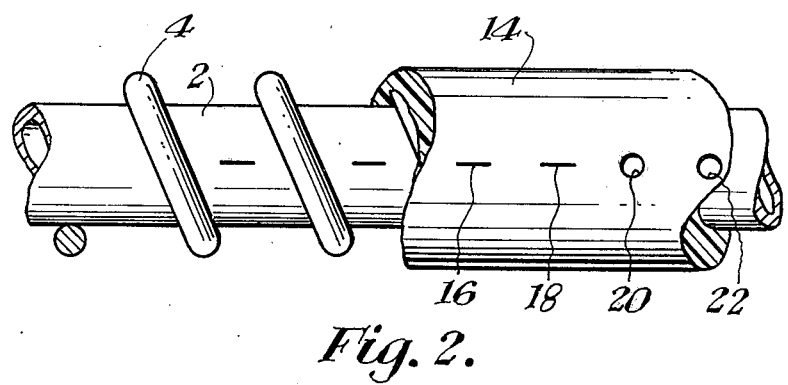
FIG. 2 is a side view of a portion of the first and second tubes and the control material in the form of a spiral wire.

Referring now to the drawing, FIGS. 1 and 2, the aeration system, generally designated by numeral 2, comprises a first resilient plastic tube 2 having a plurality of aeration slit valves 6, 8, 10 and 12 therein and control material 4, illustrated as a coil of wire, wound about the outside of tube 2 to control the opening in the aeration slit valves when the first tube is under pressure. The slits may include a plurality of rows along the longitudinal length of the tube 2. A second tube 14, as shown in FIG. 2, may be placed over the first tube 2 and the spiral coil of material 4. The second tube also includes a plurality of slit type openings 16 and 18 or perforations 20 and 22 therein. The second tube may be designed with a greater number of smaller slit valves to create greater diffusion. Said aeration system provides a non-floating, weighted aeration system having a controlled aeration flow out through the slits in said tubing system and may include a second tube 14 with a smooth outer surface to prevent the material flowing around the tubing system from snagging on said tubing system.

Figure 3:
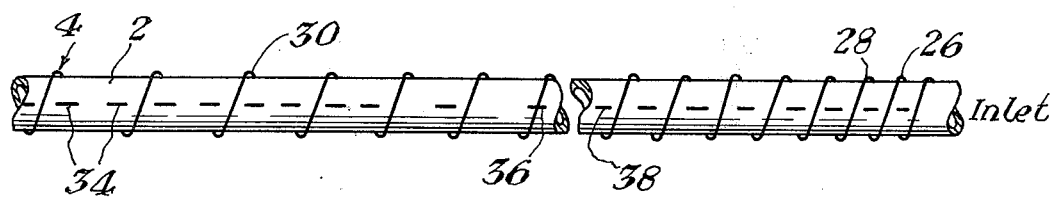
FIG. 3 is a side view of a long aeration system with a control wire wrapped about the tube.

Referring now to FIG. 3 showing the first tube 2 with a spiral control means wound around the tube. The control means 24 includes a plurality of spiral windings, shown as 26 and 28 adjacent the inlet end of tube 2 and spiral windings 30 and 32 adjacent the distal end of tube 2. The longitudinal distance between the spiral coil, such as 26–28 and 30–32 varies with the distance from the inlet end of the tube 2. The varying position of the control material 24 on the tube 2 allows the aeration system to be designed to control the quantity outflow of air in the form of bubbles out of the slit valves along the length of the aeration system. By varying the number of coils per inch along the length of the aeration system, the aeration system can generally produce an even flow of air out of the slit valves along the entire length of the aeration system. The position of these slit valves may vary; for example, two slit valves 34 between two adjacent coils, slit valve 36 beneath a coil, or one slit valve between two adjacent coils, to control the output of the aeration system.

The control means may be a spiral wire, as shown, or a perforated metal tube may be used or a ring type network of coiled material may be used.

The instant invention has been shown and described herein in what is considered to be the most practical and preferred embodiment. It is recognized, however, that departures may be made therefrom within the scope of the invention and that obvious modification will occur to a person skilled in the art.

What I claim is:

1. An aeration dispensing device comprising:
    a resilient plastic tube having a plurality of aeration slits disposed longitudinally about the circumference of said plastic tube;
    a spiral-shaped wire weight wound about the outside circumferences of said resilient plastic tube; and,
    an inlet source of fluid pressure connected at one end of said plastic tube, so constructed and arranged that the weight of said wire controls the buoyancy of said tube, the tension imparted by said wound wire controls the size of the slit openings when the tube is placed under pressure, and the distance between successive coils of said wire weight increases as a function of the distance of each of said coils from said inlet source of fluid pressure.

2. An aeration dispensing device, as described in claim 1, further comprising an outer resilient tube disposed about, and encompassing said resilient plastic tube and said spiral-shaped wire weight, said outer tube including a plurality of openings therein and having a generally smooth outer surface, so constructed and arranged that said aeration system has a smooth, non-snag outer surface.

* * * * *